Patented Aug. 19, 1952

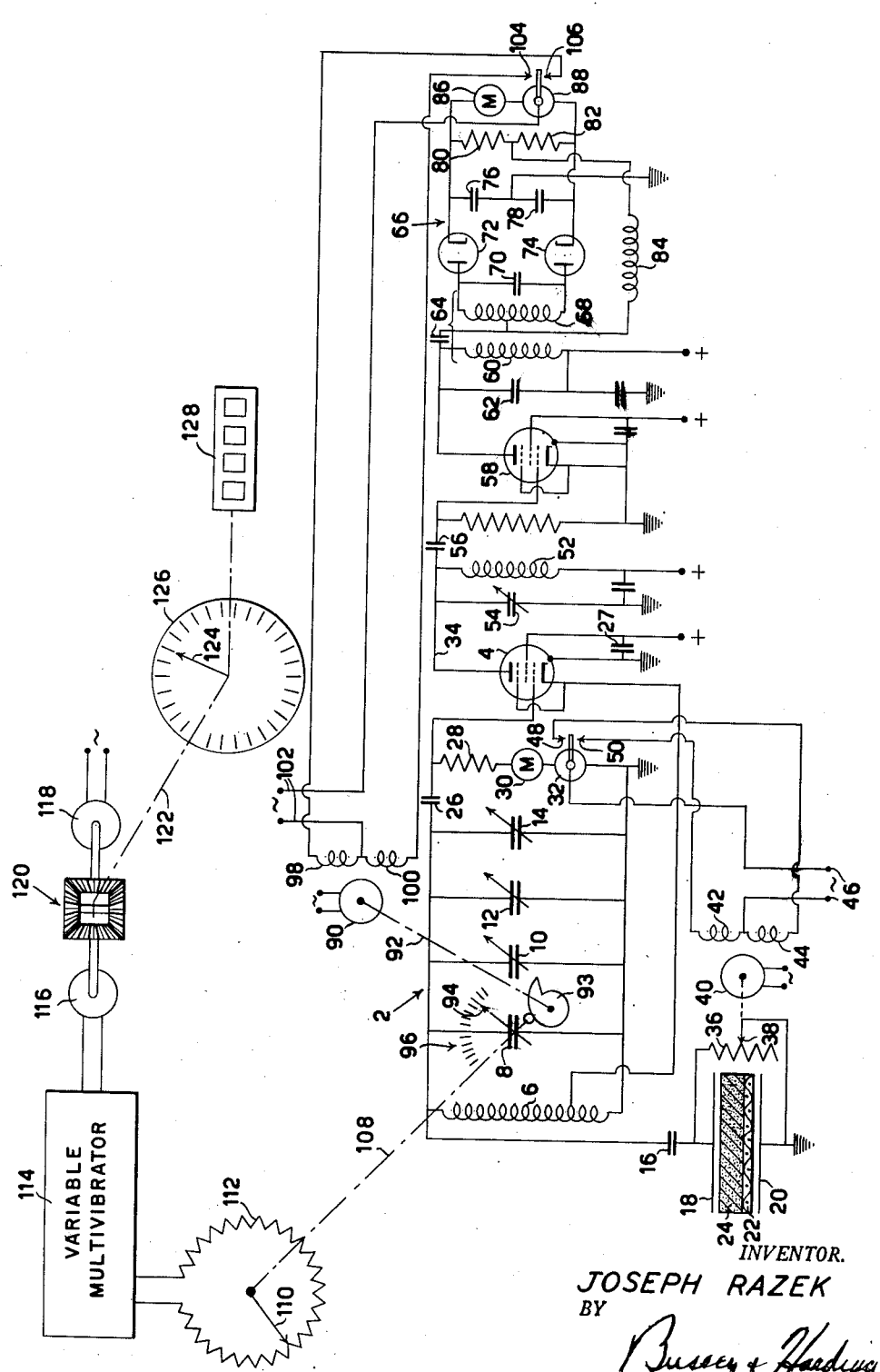

2,607,828

UNITED STATES PATENT OFFICE 2,607,828

METHOD AND APPARATUS FOR MEASURING MOISTURE CONTENT OF SAND OR THE LIKE

Joseph Razek, Llanerch, Pa., assignor to Chain Belt Company, Milwaukee, Wis., a corporation of Wisconsin Application February 11, 1949, Serial No. 75,864

18 Claims. (Cl. 175—183)

1

This invention relates to methods and apparatus for the measurement of the moisture content of granular material, particularly sand and other mineral aggregates used as ingredients in hydraulic cement concrete, and combinations of granular material such as hydraulic cement concrete.

The present invention constitutes an improvement over the invention disclosed in my prior application, Serial Number 750,986, filed May 28, 1947. As discussed in said application, the requirements of concrete designers involve the necessity for measuring the moisture content of sand or of other granular material entering into concrete within an allowable tolerance of plus or minus one pint of water per cubic yard of concrete. Through the use of the apparatus and methods of said application this accuracy of measurement is attainable. Through the use of the present invention, however, even better accuracy and definiteness of calibration are possible, using relatively simple electrical devices. As pointed out in said prior application there are two properties of the sand or other material undergoing measurement which are dependent upon the moisture content, i. e., dielectric constant and dielectric losses. These two properties may vary to some extent independently particularly if different sands are involved so that for high accuracy it would be necessary to calibrate the apparatus for each type of sand, the calibration for one not holding strictly for another.

In accordance with the present invention calibration is facilitated and higher accuracy obtained when different sands are involved. This end is accomplished by effecting, to a very substantial degree, independence of the operation from the dielectric losses by incorporating into the measuring circuit an adjustable load which maintains the losses essentially constant from the standpoint of the electrical circuit involved. Stated otherwise, in more familiar electrical terms, there is maintained constant Q of a tuned circuit which includes the sand undergoing measurement as the dielectric of a capacity in the circuit. The value of Q of this tuned circuit may be either manually adjusted to a constant value or, as hereafter disclosed, the value of Q may be automatically maintained constant in an apparatus which is highly automatic and which will indicate both instantaneous moisture content and the total moisture content of sand conveyed through the apparatus during a given interval of time.

The broad object of this invention is the attainment of the results just indicated. This object, together with other subsidiary objects which relate primarily to means for accomplishing this end, will be apparent from the following description read in conjunction with the accompanying drawing in which the figure illustrates diagrammatically certain electrical and mechanical elements of the improved apparatus.

There is indicated generally at 2 an oscillator arranged to operate at a high frequency, which frequency is not at all critical and may vary within wide limits, it having been found that frequencies of the order of two megacycles per second give excellent results. While other oscillator circuits may be used it is convenient to utilize a Hartley oscillator and this is illustrated, the oscillator comprising a pentode 4 associated with a tank circuit which includes a coil 6 shunted by a capacity which is made up of a series of condensers in parallel, these including condensers 8, 10, 12 and 14 as well as the capacity provided by a condenser 16 in series with the condenser provided by plates 18 and 20, the dielectric of which is provided by the sand 24 undergoing measurement conveyed by a belt 22. The condenser 16 is provided to avoid short circuiting by low values of an adjustable resistor referred to hereafter. The cathode of the pentode 4 is connected to an intermediate point of the coil 6, one end of this coil being connected through a condenser 26 to the control grid of the pentode 4 while the other end is grounded, the screen of the pentode 4 also being grounded from a high frequency standpoint through a condenser 27. A grid resistor 28, a direct current meter 30 and the coil of a relay 32 are connected in series between the control grid and ground.

The means for properly handling and controlling the sand passed between the plates 18 and 20 on the belt 22 may be identical with the means disclosed in detail in my prior application and need not be referred to herein. It will suffice to point out that the apparatus of the prior application insures uniformity of thickness of the layer of sand and uniformity of compactness of this layer, both of which factors are important in the securing of accurate measurements. At the same time the volumetric rate of passage by the testing zone provided by plates 18 and 20 is maintained substantially constant.

The condensers 12 and 14 are merely trimming condensers which once set require no further adjustment. The condenser 10 is arranged to be manually adjustable and serves the purpose of setting the apparatus for the particular size of the plates 18 and 20, the depth of the sand bed, the degree of compacting and other factors which may vary from time to time but which, throughout any single measurement, or group of measurements with the same sand, will be maintained substantially constant. In other words, the condensers 10, 12 and 14 are merely involved in taring the apparatus. The condenser 8 may be manually adjusted for the purpose of making measurements or, as described hereafter, is automatically adjusted for the same purpose.

Shunting the condenser provided by the plates 18 and 20 and the intermediate sand is an adjustable resistor 36 having a movable adjusting contact 38 which may also be manually adjusted but as shown is automatically adjusted.

The operation of the oscillator may now be briefly considered. The frequency of the oscillator, assuming a fixed adjustment of the resistance at 36 and assuming a fixed adjustment of the condensers 8, 10, 12 and 14, will depend not only upon the dielectric constant of the material between the condenser plates but also, to some extent, on the losses which are present due to the conductivity of the moist material. The grid current flowing through the meter 30 will depend largely upon the Q of the tuned circuit and will depend, therefore, on the losses which occur due to current conduction in the sand, the currents therein being induced by the high frequency field between the plates 18 and 20. It has been found, however, that if the Q of the circuit is maintained constant, the frequency of oscillation is relatively independent of the losses in the material being then primarily a function of the dielectric constant. The Q of the circuit may be adjusted by adjustment of the value of the resistance at 36 and the constancy of the Q is quite accurately indicated by the constancy of the grid current flowing through the meter 30, this current being relatively independent of the frequency of the oscillator. Accordingly, if during the progress of the material between the plates 18 and 20 the reading of the meter 30 is maintained constant by adjustment of the resistance 36, the Q of the tuned circuit is also maintained essentially constant and the frequency will vary as a function which is substantially solely that of the dielectric constant. Actually, as will be pointed out, even greater accuracy is secured by operating the oscillator at a constant frequency through adjustment of the condenser 8, the position of adjustment of this condenser serving as the measure of the dielectric constant. The apparatus in its preferred form, accordingly, operates in a null fashion, i. e., at constant frequency and with constant losses.

To provide for the detection of a constant frequency condition the output of the oscillator is taken off through a connection 34 from the anode of pentode 4 to a limiter which includes a pentode 58 operating under conventional limiting conditions, i. e., of low anode and screen potentials, the input being from the line 34 through a condenser 56 to the control grid of this tube. In the input circuit of the limiter there is a tuned circuit comprising the coil 52 and condenser 54, the tuned circuit being adjusted to resonance at the fixed frequency of operation desired.

The output from the tube 58 is fed to a discriminator of a conventional type indicated generally at 66. This comprises a pair of tuned circuits, one comprising the coil 60 and condenser 62 and the other comprising coil 68 and condenser 70, the coils being inductively coupled together. A condenser 64 joins the anode of pentode 58 to the midpoint of coil 68. Diodes 72 and 74 are respectively connected to the ends of the coil 68 and to the symmetrical array of condensers 76 and 78 and resistors 80 and 82. The midpoint of coil 68 is connected to the junction of resistors 80 and 82 through choke 84. A meter 86 and a relay 88 are connected between the outer ends of the resistors 80 and 82. This discriminator functions in conventional fashion to provide, for frequencies above and below resonance, reversal of current flow through the meter 86 and relay 88, the current through these being zero at resonance.

The two relays 32 and 88 control, respectively, the automatic adjustments of resistance 36 and condenser 8. These relays and their connections are conventionalized in the circuit shown since they may be replaced by motor-controlling thyratrons and, in general, should be more elaborate than illustrated in the sense of inclusion of anti-hunting devices such as are conventional in the control art. However, for simplicity, and since such anti-hunting devices form, per se, no part of the present invention, the relay 32 is illustrated as provided with a contact arm energized from an alternating source 46 which may selectively engage contacts 48 and 50 to effect selective flow of current through the field coils 44 and 42 of a reversible motor 40 which, through suitable connections, including reduction gearing, may move the contact 38 along the resistor 36. Similarly, the arm of the relay 88 may selectively engage the contacts 104 and 106 to selectively cause flow of current from the source 102 through the field coils 100 and 98 of the reversing motor 90 which, through connections 92, including reduction gearing and a suitably shaped cam such as 93 and its follower, may serve to adjust the capacity of condenser 8, the shaft of which carries a pointer 94 moving along a scale 96 which may be calibrated in terms of water content of the material undergoing measurement.

The shaft of the condenser 8 is connected through shaft 108 to the arm 110 of a potentiometer 112 which controls the frequency of a variable frequency multivibrator 114. The output from this multivibrator drives a synchronous motor 116 which, together with a synchronous motor 118 driven from the commercial alternating current supply (or from a generator driven by the drive arrangement for the belt 22), furnishes the drive of a differential gearing 120, the output of which is delivered through shafting indicated at 122 to drive a counter 128 and a pointer 124 moving on a dial 126, the counter 128 counting complete rotations of the differential output shafting and the pointer serving to indicate fractions of revolutions. This system, driven through shaft 108, serves as an integrator and has the construction and functions detailed in my prior application and will not require any further description except to point out that under conditions of zero moisture content the motors 116 and 118 will operate at the same frequency (e. g., sixty cycles) so that the counter 128 and pointer 124 are stationary, whereas with increased moisture content rotation of the dial and pointer will occur to integrate over a period of time or over a given displacement of belt 22 the moisture content of the sand or other material 24, this material being advanced at a uniform linear and volumetric rate by the belt 22.

The operation of the apparatus is as follows: Preliminary adjustments are so made that under conditions of zero moisture content, as provided by dry sand or other material between the plates 18 and 20, the meter 86 will indicate zero, the pointer 94 will point to zero on the scale 96 and the multivibrator will produce current at the frequency of the supply to the motor 118, the meter 30 at this time indicating some constant fixed value to which corresponds a position of the arm of the relay 32 midway between contacts 48 and 50. Under these conditions the resistance 36 will be automatically adjusted to a condition of providing losses in the oscillator tank circuit corresponding to the maximum which would be expected if material of maximum moisture content expected to be measured was located between the plates 18 and 20. As operation proceeds and sand or other material containing moisture passes between the plates 18 and 20 the current through the meter 30 will vary and the relay 32 will drive the motor 40 to maintain substantially constant the Q of the oscillator tank as heretofore indicated. This action removes one variable factor from the operation of the oscillator. The frequency of the oscillator will also tend to change but through the limiter and discriminator any deviation of the reading of the meter 86 will result in the operation of the relay 88 to effect readjustment of the condenser 8 through the motor 90 to bring the frequency back to its constant value. At the same time, through the connection 108 the integrating system is operated so that while the pointer 94 will indicate the instantaneous value of moisture the integration will sum the moisture content for any desired period of operation to give the total moisture content through that period. Particularly by virtue of maintaining the value of Q constant, this apparatus will give very accurate measurements of both instantaneous and integrated moisture content. The oscillator operates at a null condition of fixed losses and fixed frequency, the result being that the adjustment of condenser 8 to maintain fixed frequency is dependent primarily on only one variable, the dielectric constant of the material, rather than on both this and a second variable, the losses in the material. As a result, much more accuracy and reliability of operation and calibration may be secured than in the case of apparatus depending upon both variables for its operation.

It may be noted that the apparatus in simpler form, without the automatic controls, may be manually operated, if desired, to measure moisture contents of batches of material placed between the plates 18 and 20 in a suitable container. In the case of manual operation the operator would first adjust the resistance at 36 to secure the proper constant reading of the meter 30. Then by manual adjustment of the condenser 8 the meter 86 would be brought to zero whereupon the moisture content would be directly readable by the position of the pointer 94 in relation to the scale 96.

Instead of using the position of condenser 8 to indicate moisture content and to control the integrator, it is possible to associate an indicating pointer such as 94 and the integrator control such as 110 with the adjustable contact of resistor 36, which in such case may be driven by its motor 40 through a cam such as 93, properly contoured to provide the required law of response. Here, also, the two variables will be effectively separated, the indications in this last instance being dependent only on the losses in the material and relatively independent of dielectric constant.

It will be evident, particularly by reference to my prior application, that various elements of the apparatus may be modified by substitution of equivalent devices without departing from the scope of the invention as defined in the following claims.

What I claim and desire to protect by Letters Patent is:

1. Apparatus for the measurement of moisture content of material comprising an oscillator including a tuned circuit in part formed by a condenser having as its dielectric the material undergoing measurement, means for adjusting to a substantially constant value the Q of said tuned circuit, and means for exhibiting a condition of operation of said circuit as a measure of the moisture content of the material.

2. Apparatus for the measurement of moisture content of material comprising an oscillator including a tuned circuit in part formed by a condenser having as its dielectric the material undergoing measurement, means for adjusting to a substantially constant value the Q of said tuned circuit, and means for adjusting to a substantially constant value the frequency of said oscillator.

3. Apparatus for the measurement of moisture content of material comprising an oscillator including a tuned circuit in part formed by a condenser having as its dielectric the material undergoing measurement, means, including a variable resistance shunting said condenser, for adjusting to a substantially constant value the Q of said tuned circuit, and means for exhibiting a condition of operation of said circuit as a measure of the moisture content of the material.

4. Apparatus for the measurement of moisture content of material comprising an oscillator including a tuned circuit in part formed by a condenser having as its dielectric the material undergoing measurement, means, including a variable resistance shunting said condenser, for adjusting to a substantially constant value the Q of said tuned circuit, and means for adjusting to a substantially constant value the frequency of said oscillator.

5. Apparatus for the measurement of moisture content of material comprising an oscillator including a tuned circuit in part formed by a condenser having as its dielectric the material undergoing measurement, means for adjusting to a substantially constant value the Q of said tuned circuit, means for adjusting to a substantially constant value the frequency of said oscillator, and indicating means associated with one of said adjusting means for exhibiting a measurement of the moisture content of the material.

6. Apparatus for the measurement of moisture content of material comprising an oscillator including a tuned circuit in part formed by a condenser having as its dielectric the material undergoing measurement, means for adjusting to a substantially constant value the Q of said tuned circuit, means for adjusting to a substantially constant value the frequency of said oscillator, and indicating means associated with the last mentioned adjusting means for exhibiting a measurement of the moisture content of the material.

7. Apparatus for the measurement of moisture content of material comprising an oscillator including a tuned circuit in part formed by a condenser having as its dielectric the material undergoing measurement, means, including a variable resistance shunting said condenser, for adjusting to a substantially constant value the Q of said tuned circuit, means for adjusting to a substantially constant value the frequency of said oscillator, and indicating means associated with one of said adjusting means for exhibiting a measurement of the moisture content of the material.

8. Apparatus for the measurement of moisture content of material comprising an oscillator including a tuned circuit in part formed by a condenser having as its dielectric the material undergoing measurement, means, including a variable resistance shunting said condenser, for adjusting to a substantially constant value the Q of said tuned circuit, means for adjusting to a substantially constant value the frequency of said oscillator, and indicating means associated with the last mentioned adjusting means for exhibiting a measurement of the moisture content of the material.

9. Apparatus for the measurement of moisture content of material comprising a tuned circuit in part formed by a condenser having as its dielectric the material undergoing measurement, means for adjusting to a substantially constant value the Q of said tuned circuit, and means for adjusting said tuned circuit substantially to resonance at a predetermined frequency.

10. Apparatus for the measurement of moisture content of material comprising a tuned circuit in part formed by a condenser having as its dielectric the material undergoing measurement, means, including a variable resistance shunting said condenser, for adjusting to a substantially constant value the Q of said tuned circuit, and means for adjusting said tuned circuit substantially to resonance at a predetermined frequency.

11. Apparatus for the measurement of moisture content of material comprising a tuned circuit in part formed by a condenser having as its dielectric the material undergoing measurement, means for adjusting to a substantially constant value the Q of said tuned circuit, means for adjusting said tuned circuit substantially to resonance at a predetermined frequency, and indicating means associated with one of said adjusting means for exhibiting a measurement of the moisture content of the material.

12. Apparatus for the measurement of moisture content of material comprising a tuned circuit in part formed by a condenser having as its dielectric the material undergoing measurement, means for adjusting to a substantially constant value the Q of said tuned circuit, means for adjusting said tuned circuit substantially to resonance at a predetermined frequency, and indicating means associated with the last mentioned adjusting means for exhibiting a measurement of the moisture content of the material.

13. Apparatus for the measurment of moisture content of material comprising a tuned circuit in part formed by a condenser having as its dielectric the material undergoing measurement, means, including a variable resistance shunting said condenser, for adjusting to a substantially constant value the Q of said tuned circuit, means for adjusting said tuned circuit substantially to resonance at a predetermined frequency, and indicating means associated with one of said adjusting means for exhibiting a measurement of the moisture content of the material.

14. Apparatus for the measurement of moisture content of material comprising a tuned circuit in part formed by a condenser having as its dielectric the material undergoing measurement, means, including a variable resistance shunting said condenser, for adjusting to a substantially constant value the Q of said tuned circuit, means for adjusting said tuned circuit substantially to resonance at a predetermined frequency, and indicating means associated with the last mentioned adjusting means for exhibiting a measurement of the moisture content of the material.

15. Apparatus for the measurement of moisture content of material comprising an oscillator including a tuned circuit in part formed by a condenser having as its dielectric the material undergoing measurement, means responsive to losses in said tuned circuit for automatically maintaining at a substantially constant value the Q of said tuned circuit, and means responsive to variations of frequency of said oscillator for automatically maintaining said frequency substantially constant.

16. Apparatus for the measurement of moisture content of material comprising an oscillator including a tuned circuit in part formed by a condenser having as its dielectric the material undergoing measurement, means responsive to losses in said tuned circuit for automatically maintaining at a substantially constant value the Q of said tuned circuit, said means including a variable resistance shunting said condenser, and means responsive to variations of frequency of said oscillator for automatically maintaining said frequency substantially constant.

17. The method of measuring the moisture content of material comprising locating said material in position to form the dielectric of a condenser forming part of a tuned circuit, adjusting the Q of said circuit to a substantially constant value, adjusting said circuit to resonance at a substantially constant frequency, and exhibiting a condition of operation of said circuit at resonance as a measure of moisture content.

18. The method of measuring the moisture content of material comprising locating said material in position to form the dielectric of a condenser forming part of a tuned circuit determinative of the frequency of an oscillator, adjusting the Q of said circuit to a substantially constant value, adjusting said circuit to produce a predetermined frequency of oscillation of said oscillator, and exhibiting a condition of operation of said circuit when producing said predetermined frequency as a measure of moisture content.

JOSEPH RAZEK.

REFERENCES CITED

The following references are of record in the file of this patent:

UNITED STATES PATENTS

| Number | Name | Date |
| --- | --- | --- |
| 1,822,604 | Simons et al. | Sept. 8, 1931 |
| 1,932,337 | Dowling | Oct. 24, 1933 |
| 2,123,812 | Stevens et al. | July 12, 1938 |
| 2,266,114 | Bartlett | Dec. 16, 1941 |
| 2,337,759 | Loughlin | Dec. 8, 1943 |
| 2,387,496 | Cornelius | Oct. 23, 1945 |